United States Patent [19]
Allen et al.

[11] Patent Number: 5,319,729
[45] Date of Patent: Jun. 7, 1994

[54] OPTICAL FIBRE INTERFACE UTILIZING WELDED SILICA PARTS

[75] Inventors: James J. Allen; Noorallah Nourshargh, both of London, England

[73] Assignee: GPT Limited, England

[21] Appl. No.: 978,672
[22] PCT Filed: Jan. 10, 1992
[86] PCT No.: PCT/GB92/00059
    § 371 Date: Feb. 25, 1993
    § 102(e) Date: Feb. 25, 1993
[87] PCT Pub. No.: WO92/12446
    PCT Pub. Date: Jul. 23, 1992

[30] Foreign Application Priority Data
Jan. 11, 1991 [GB] United Kingdom ................ 9100680

[51] Int. Cl.⁵ .............................................. G02B 6/36
[52] U.S. Cl. ......................................... 385/90; 385/91
[58] Field of Search ............................... 385/88, 90, 91

[56] References Cited

U.S. PATENT DOCUMENTS

| | | | |
|---|---|---|---|
| 4,186,994 | 2/1980 | Denkin et al. | 385/90 |
| 4,647,147 | 3/1987 | Pikulski et al. | 385/91 |
| 4,887,882 | 12/1989 | Mousseaux et al. | 385/52 |
| 4,946,553 | 8/1990 | Courtney et al. | 156/304.1 |
| 5,101,464 | 3/1992 | Moussseaux et al. | 385/88 |
| 5,155,786 | 10/1992 | Ecker et al. | 385/94 |
| 5,210,811 | 5/1993 | Avelange et al. | 385/91 |

FOREIGN PATENT DOCUMENTS

0358592  3/1990  European Pat. Off. .
0420027  4/1991  European Pat. Off. .

OTHER PUBLICATIONS

"Laser Welded Fibre Waveguide Interfacing", J. J. Allen, et al, Ninth Annual European Fibre Optic Communications and Local Area Network Conference, London, Jun. 19-21, 1991.

*Primary Examiner*—Frank Gonzalez
*Attorney, Agent, or Firm*—Kirschstein, Ottinger, Israel & Schiffmiller

[57] ABSTRACT

The material similarity of all-silica waveguides or other devices and optical fibers is utilized to establish an epoxy-free fusion interfacing between optical fibers and integrated-optic devices by using laser welding techniques. This is uniquely applicable to all-silica integrated devices since they have virtually identical material properties to those of optical fibers. The method comprises the steps of machining a locating groove in a silica block, fixing a prepared length of the optical fiber in the locating groove, bringing the block and the device into juxtaposition and aligning the block and the device to provide maximum transmission of a signal from the fiber to the device and laser welding the block and the device together.

9 Claims, 3 Drawing Sheets

OPTICAL FIBRE INTERFACE UTILIZING WELDED SILICA PARTS

BACKGROUND OF THE INVENTION

One of the most important stages in the manufacture of integrated optic devices is the interfacing of integrated optic devices such as waveguides to optical fibres. This might involve individual fibres or fibre arrays; for both cases, however, all the reported techniques to date rely upon the use of adhesives, epoxies or solders. These all have different physical properties (e.g. thermal expansion) to those of silica fibres, thereby affecting the long term stability of the interface.

SUMMARY OF THE INVENTION

According to the present invention there is provided a method of interfacing an optical fibre to a silica integrated optic device comprising the steps of machining a locating groove in a silica block, fixing a prepared length of the optical fibre in the locating groove, bringing the block and the device into juxtaposition and aligning the block and the device to provide maximum transmission of a signal from the fibre to the device and laser welding the block and the device together by producing a series of spaced welds on either side of the fibre optic/device interface.

There is further provided a fibre optic/device interface produced using the method above.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

In accordance with the present invention the material similarity of all-silica waveguides or other devices and optical fibres is utilised to establish an epoxy-free fusion interfacing between optical fibres and integrated-optic devices by using laser welding techniques. This is uniquely applicable to all-silica integrated devices since they have virtually identical material properties to those of optical fibres. In order to produce a silica to silica weld, localised heating of the material is required to a temperature of approximately 2000° C. This has been readily achieved using a $CO_2$ laser.

Figure 1A:
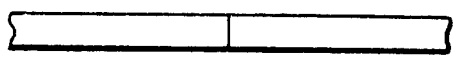
FIGS. 1a–1e show diagrammatic representations of the various weld formats available.
Figure 1B:
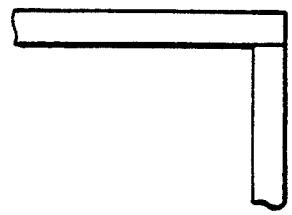
Figure 1C:
Figure 1E:
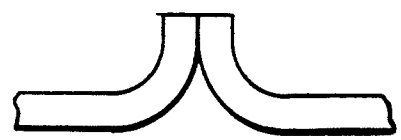
Figure 1D:
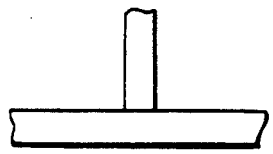

There are several types of weld available e.g. butt, corner, lap, T and edge welds as shown diagrammatically in FIGS. 1a–1e. These may be subdivided further as each may be either continuous seam, pulsed seam or spot welded. For the present application, the butt or lap welds, FIGS. 1a or 1b, are most useful. The butt joint, FIG. 1a, must be seam welded since there is no overlap to spot weld, whereas the lap joint, FIG. 1b, may be spot or seam welded.

The spot weld requires a highly focused beam to penetrate the top substrate causing fusion of the two around the periphery of the beam. The seam weld requires a defocused beam to heat both substrates, such that fusion occurs at the molten interface. The joint may be welded along the length of an interface or at selected points along this interface.

Figure 2:
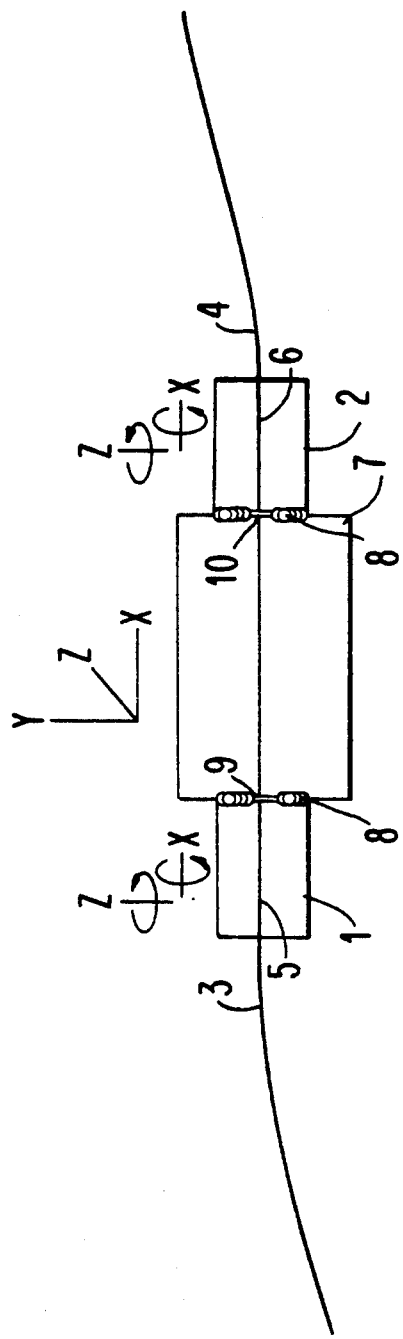
FIG. 2 is a diagrammatic view of a laser welding arrangement.

The principle of the laser welding technique is as follows: two silica blocks 1, 2 containing the input and output single mode fibres 3, 4 in laser-cut V-grooves 5, 6 are aligned with the waveguide block and laser welds 8 are formed between the three blocks 1, 2, 7 along two interfaces 9, 10 as shown in FIG. 2.

Figure 3:
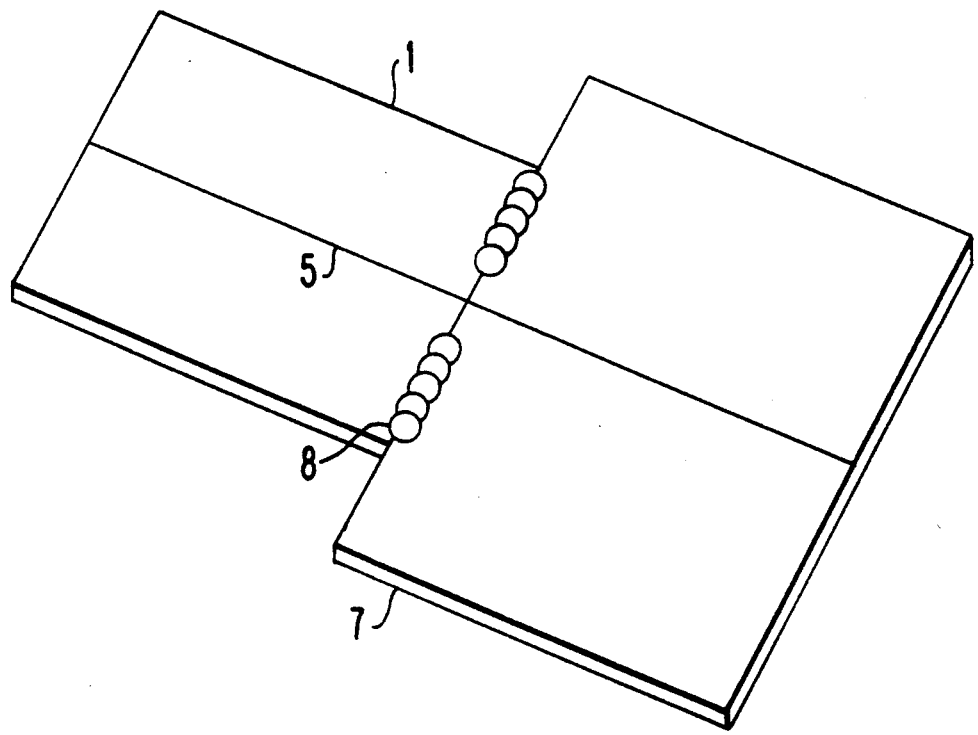
FIG. 3 shows a schematic representation of a weld structure.

The laser welding process consists of a number of small and closely spaced (0.5 mm) welds 8 (see FIG. 3) on either side of the fibre/waveguide interface 9, 10. Each weld takes about 0.5 seconds to produce using a slightly defocused $CO_2$ laser beam. The waveguide 7 and fibre blocks 1, 2 are mounted on a 5-axis alignment stage (not shown) fixed to a computer controlled XY table (not shown) which enables accurate positioning of the target area with respect to the beam and also controls the firing of the laser. Once the fibre-waveguide alignment has been optimised, the entire welding process is carried out automatically in less than 10 seconds.

Figure 4:
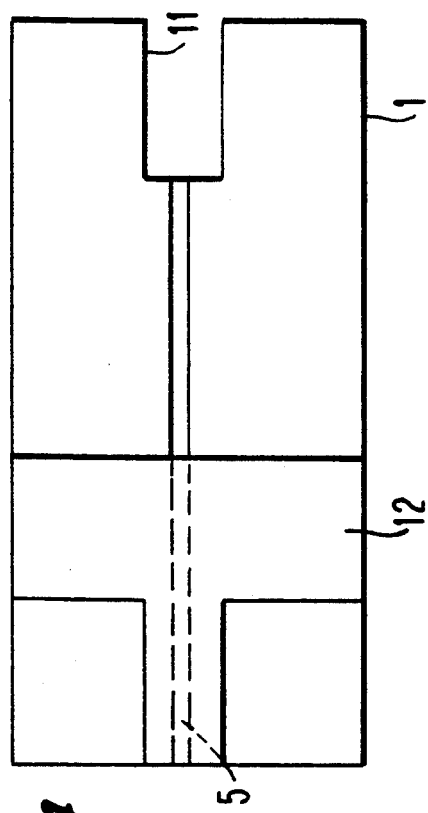
FIG. 4 shows a view of the preferred V-groove silica block design.
Figure 5:
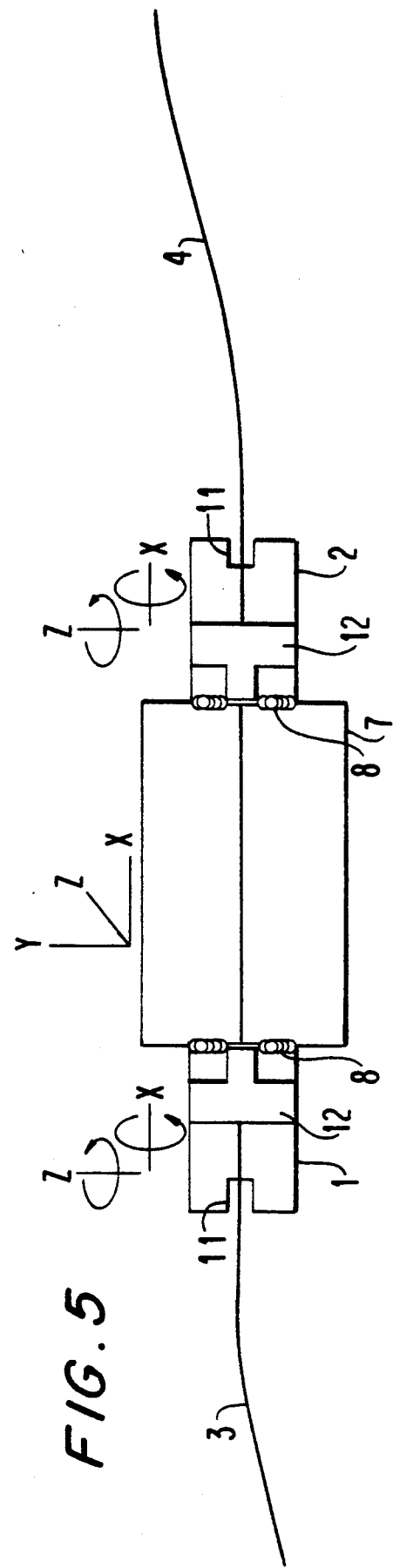
FIG. 5 shows a view of a completed welded assembly.

A preferred construction is shown in FIGS. 4 and 5. In FIG. 4 a silica block 1, has a V-groove 5.

A cut-out 11 is arranged to accept the primary coating of an optical fibre to avoid any micro-bends, which fibre is located in the V-groove 5. A T-shaped offcut 12 on the block 1 is used to hold the fibre in the V-shaped groove 5, for instance using a UV epoxy adhesive, as shown in FIG. 5.

The V-groove 5 may be a single groove as shown, or a series of parallel grooves for use with a fibre ribbon, such as would be used for the outputs of a 1×8 splitter or the inputs or outputs of a 16×16 star coupler.

Alternatively, the offcut 12 may be welded to the block 1 to retain the fibre.

An alternative approach to fixing the optical fibres 3, 4 in the grooves 5, 6 is to laser weld the fibers 3, 4 to the block 1, 2 along the line of contact with the block 1, 2.

We claim:

1. A method of interfacing an optical fibre to an integrated optic device of silica material, comprising the steps of:
   (a) forming a locating groove in a block of silica material;
   (b) fixing a prepared length of the optical fibre in the locating groove;
   (c) juxtaposing and aligning the silica block and the silica device to provide maximum transmission of a signal between the fibre and the silica device; and
   (d) directly fusing the silica material to the silica block and the silica material of the silica device together to form an epoxy-free, all-silica joint between the silica block and the silica device.

2. The method according to claim 1, wherein the forming step is performed by machining the locating groove.

3. The method according to claim 2, wherein the machining step is performed by directing a laser beam along a surface of the silica block.

4. The method according to claim 1, wherein the fixing step is performed by laser welding the fibre into and along the locating groove in the silica block.

5. The method according to claim 1, wherein the fusing step is performed by laser welding a plurality of welds spaced apart of one another at the joint.

6. The method according to claim 1, wherein the fusing step is performed by laser welding a butt weld at the joint.

7. The method according to claim 1; and further comprising the steps of providing another block of silica material, forming another locating groove in said other silica block, fixing a prepared length of another optical fibre in said other locating groove of said other silica block, juxtaposing and aligning both silica blocks at opposite sides of the silica device to provide maximum transmission of a signal between both fibres and the silica device, and directly fusing the silica material of said other silica block and the silica material of said silica device to form another epoxy-free, all-silica joint between said other silica block and the silica device.

8. An interface between an optical fibre and an integrated optic device of silica material, comprising:
  (a) a block of silica material having a locating groove for receiving a prepared length of the optical fibre; and
  (b) said silica block being in juxtaposed alignment with the silica device, and forming an epoxy-free, all-silica joint between the silica block and the silica device by direct fusion between the silica material of the silica block and the silica material of the silica device.

9. The interface according to claim 8, wherein the silica device is an optical waveguide.

* * * * *